US012188467B2

(12) United States Patent
Darnell et al.

(10) Patent No.: US 12,188,467 B2
(45) Date of Patent: Jan. 7, 2025

(54) HYDRAULIC CONTROL SYSTEM FOR LINEAR ACTUATION

(71) Applicant: Danfoss Power Solutions Inc., Ames, IA (US)

(72) Inventors: Aaron Darnell, Nordborg (DK); Zhekang Du, Nordborg (DK); Simon Nielsen, Nordborg (DK)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 0 days.

(21) Appl. No.: 18/000,782

(22) PCT Filed: Jun. 9, 2021

(86) PCT No.: PCT/US2021/036558

§ 371 (c)(1), (2) Date: Dec. 5, 2022

(87) PCT Pub. No.: WO2021/252592

PCT Pub. Date: Dec. 16, 2021

(65) Prior Publication Data

US 2023/0213031 A1 Jul. 6, 2023

Related U.S. Application Data

(60) Provisional application No. 63/036,639, filed on Jun. 9, 2020.

(51) Int. Cl.

| | |
|---|---|
| ***B66F 7/06*** | (2006.01) |
| ***B66F 7/08*** | (2006.01) |
| ***F04B 17/03*** | (2006.01) |
| ***F04B 23/02*** | (2006.01) |
| ***F04B 49/22*** | (2006.01) |

(Continued)

(52) U.S. Cl.

CPC .............. *F04B 49/22* (2013.01); *B66F 7/065* (2013.01); *B66F 7/08* (2013.01); *F04B 17/03* (2013.01);

(Continued)

(58) Field of Classification Search

CPC . F15B 11/08; F15B 11/10; F15B 2211/20515; F15B 2211/30505; F15B 2211/6313

See application file for complete search history.

(56) References Cited

U.S. PATENT DOCUMENTS 4,142,368 A * 3/1979 Mantegani .............. B30B 15/22 60/416
4,548,296 A * 10/1985 Hasegawa ................. B66F 9/22 91/452

(Continued)

FOREIGN PATENT DOCUMENTS

DE 4140408 A1 6/1993
DE 4329977 A1 * 3/1995 .............. F15B 11/16

OTHER PUBLICATIONS

DE4140408A1—English Translation Abstract.
International Search Report and Written Opinion; PCT/US2021/036558; mailed Sep. 14, 2021.

*Primary Examiner* — Michael Leslie
(74) *Attorney, Agent, or Firm* — ZarleyConley PLC

(57) ABSTRACT

A hydraulic control system for linear actuation that includes an electric motor connected to a hydraulic pump and a hydraulic cylinder connected to the pump by a first flow line. A pressure transducer, a pressure control valve, and a check valve are connected to the first flow line between the pump and the cylinder and a tank is connected to the pump by a second flow line and the cylinder by a return line. A control valve is connected between the first flow line and the return line.

19 Claims, 1 Drawing Sheet

(51) Int. Cl.
*F15B 11/05* (2006.01)
*F15B 15/18* (2006.01)

(52) U.S. Cl.
CPC .............. *F04B 23/02* (2013.01); *F15B 11/05* (2013.01); *F15B 15/18* (2013.01); *F15B 2211/20515* (2013.01); *F15B 2211/20538* (2013.01); *F15B 2211/30505* (2013.01); *F15B 2211/30515* (2013.01); *F15B 2211/413* (2013.01); *F15B 2211/41581* (2013.01); *F15B 2211/426* (2013.01); *F15B 2211/46* (2013.01); *F15B 2211/465* (2013.01); *F15B 2211/50536* (2013.01); *F15B 2211/528* (2013.01); *F15B 2211/6313* (2013.01); *F15B 2211/6346* (2013.01); *F15B 2211/6654* (2013.01); *F15B 2211/7052* (2013.01); *F15B 2211/75* (2013.01); *F15B 2211/761* (2013.01); *F15B 2211/8633* (2013.01)

(56) References Cited

U.S. PATENT DOCUMENTS

| | | | | |
|---|---|---|---|---|
| 6,202,685 | B1 * | 3/2001 | Neumair ................ | G05D 16/10 60/431 |
| 6,702,010 | B2 * | 3/2004 | Yuratich ................. | E21B 47/01 166/241.5 |
| 6,837,045 | B2 * | 1/2005 | Heusser ................ | F15B 20/008 60/403 |
| 2007/0017731 | A1 | 1/2007 | Soerensen | |
| 2010/0322791 | A1 | 12/2010 | Wadsley et al. | |
| 2017/0306936 | A1 | 10/2017 | Dole et al. | |
| 2019/0249670 | A1 | 8/2019 | Dole et al. | |
| 2023/0174353 | A1 * | 6/2023 | Du .......................... | F15B 11/04 254/93 R |
| 2023/0175531 | A1 * | 6/2023 | Darnell ................... | F15B 11/08 60/477 |

* cited by examiner

HYDRAULIC CONTROL SYSTEM FOR LINEAR ACTUATION

BACKGROUND OF THE INVENTION

Controlling linear actuation of a hydraulic device is known in the art. For example, with respect to a scissor lift, as shown in FIG. 2, an on/off valve N is used to control the lowering function of the scissor lift. The hydraulic cylinder 9 retracts once the on/off valve moves to a position to the right. The lowering function is load dependent and cannot be adjusted. Thus, if there is more weight on the platform, the scissor lift will drop faster, and if there is less weight, the scissor lift will drop slower. Further, the control of the lowering function is not smooth.

The scissor lift market has been moving toward electrification and their existing suppliers in the market for electric drive motors. However, there exists no good solution for electrifying lift systems. While the present invention is discussed in the context of a scissor lift system, the invention is applied to any compact hydraulic powered by an electric motor that is applied anywhere linear actuation is needed, especially for hydraulic cylinders with duty cycle matching design specifications.

The speed of the lowering function of the cylinder is governed by the orifice equation as described in Eq. 1 and 2.

$$Q = k \cdot A_{orifice} \cdot \sqrt{\Delta P} \qquad \text{Equation (1)}$$

$$V = \frac{Q}{A_{cap}} \qquad \text{Equation (2)}$$

Where:

Q is the flow rate through the orifice (labeled as O in FIG. 2)

k is the orifice constant $A_{orifice}$ is the opening area in the orifice (labeled as O in FIG. 2)

$\Delta P$ is the pressure differential across the orifice (labeled as O in FIG. 2)

V is the velocity of cylinder retraction (which is not the same as platform speed)

$A_{cap}$ is the area of the cap side of the cylinder

According to the equations above, in order to control the retraction speed of the cylinder (flow rate), independent of the load weight (pressure differential), the orifice area needs to be controlled and adjusted based on the load weight. If speed control is needed, the orifice area can also be further adjusted. In order to achieve a smooth control operation, proportional speed control and load dependent control are essential.

As electrification of powertrains becomes more common, machine OEMs are redesigning their system architectures to be more optimal. In the case of aerial work platforms like scissor lifts, this means using a dedicated power pack hydraulic system for the platform lifting function. Such power packs usually vary the speed of a fixed-displacement pump (like a gear pump) in order to directly vary the speed of an actuator (like a hydraulic cylinder). Most external gear pumps have an operating envelope that defines, especially, the minimum allowed speed as a function of pump output pressure. Operating outside of this envelope can reduce the operating life and performance of a pump. However, avoiding these low speeds outside of the allowed envelope means that low flow rates and, consequently, low cylinder actuation rates cannot be achieved directly.

To solve this problem one could simply ignore the gear pump operating envelope, but this would potentially reduce pump life and performance. One could also prevent the system from operation at low speeds, but this would reduce machine controllability. Also, one could throttle all lifting flow directly with a dedicated proportional valve, but this generally is less efficient and requires additional dedicated hardware to be installed into the system. Finally, one could use a variable-displacement pump, potentially with zero-displacement capability, but this is far too expensive for a scissor lift power pack.

Accordingly, in many applications, including scissor lifts, it is desired to have a fully proportional speed control from zero to maximum speed to maintain safety, comfort, and overall controllability in all working conditions and avoiding damage to the work environment.

An objective of the present invention is to provide a hydraulic control system that more precisely controls linear actuation.

Another objective of the present invention is to provide a hydraulic control system that controls linear actuation from zero to maximum speed safely and comfortably and avoids damage in the work environment.

These and other objective will be apparent to those having ordinary skill in the art based upon the following written description, drawings, and claims

SUMMARY OF THE INVENTION

A hydraulic control system for linear actuation includes an electric motor connected to a hydraulic pump and a hydraulic cylinder connected to the pump by a first flow line. A pressure transducer, a pressure control valve, and a check valve are connected to the first flow line between the pump and the cylinder. A tank is connected to the pump by a second flow line and the cylinder by a control line. A control valve is connected between the first flow line and the return line and is connected to the first flow line between the check valve and the pump.

A proportional control valve is connected between the first flow line and the return line and is connected to the first flow line between the check valve and the pressure control valve. The proportional control valve is also connected to a processor and an operator command. An opening area of the proportional control valve is controlled by the processor. The processor controls the proportional control valve based upon a pressure measurement and the pressure measurement is determined from a command signal from the operator command and a signal from the pressure transducer.

DETAILED DESCRIPTION OF THE PREFERRED EMBODIMENTS

Figure 1:
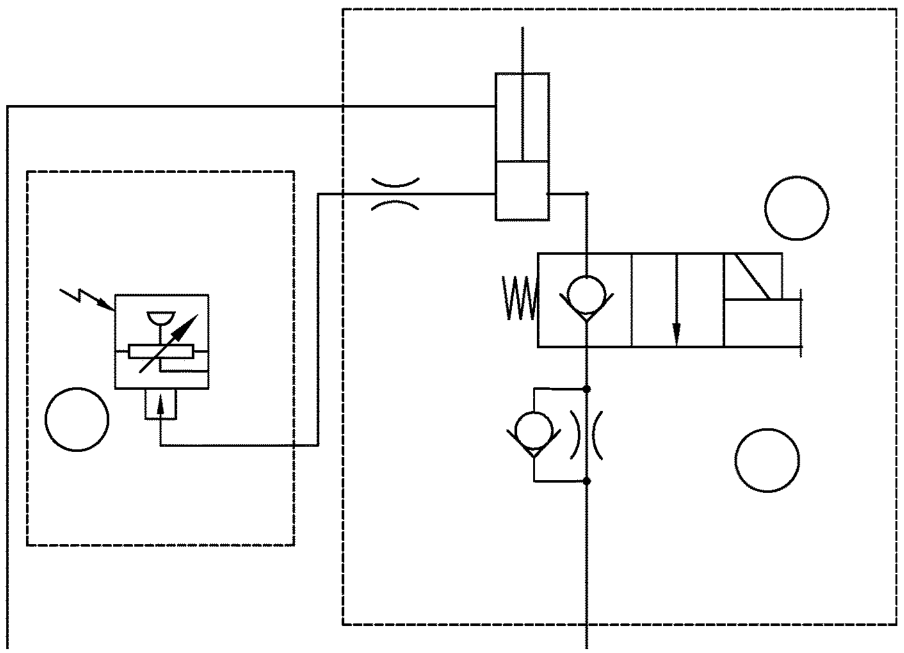
FIG. 1 is a schematic view of a lift system.
Figure 2:
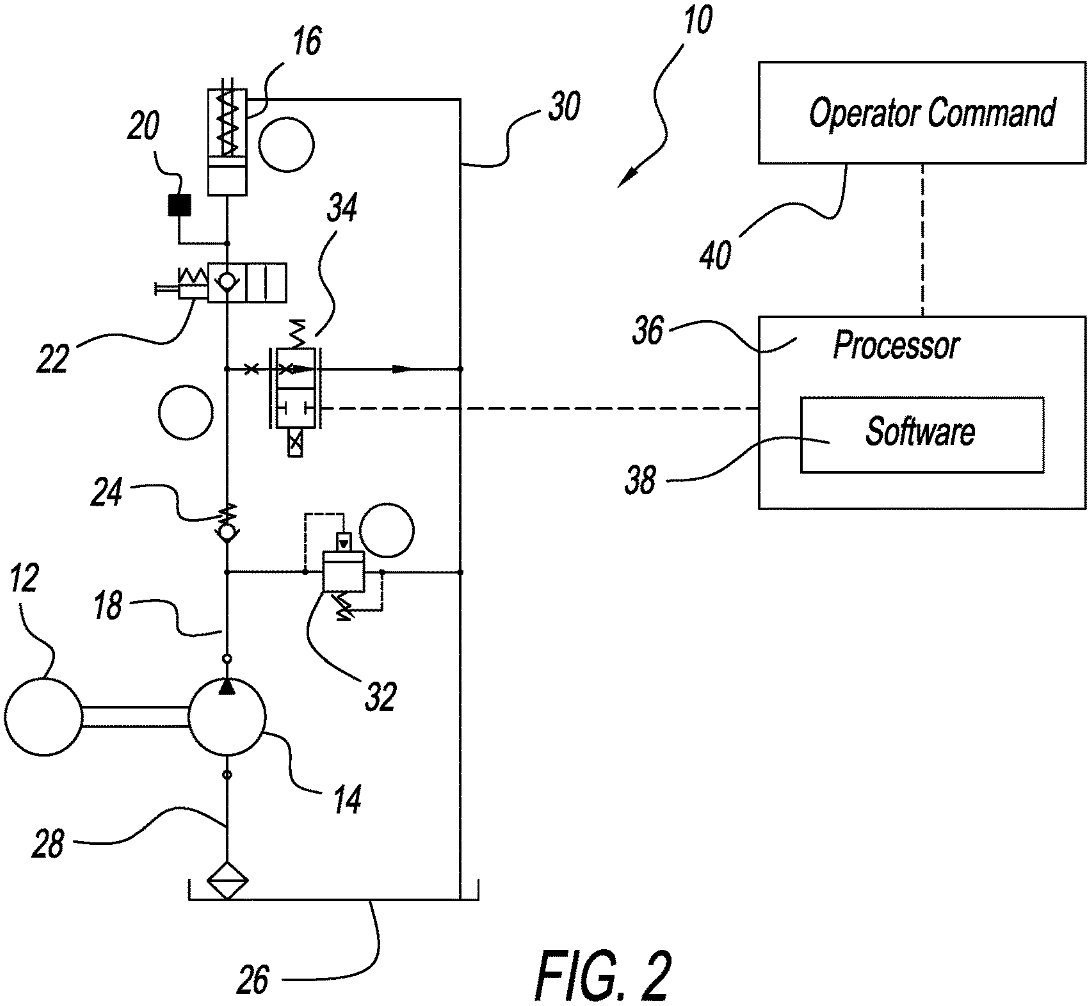
FIG. 2 is a schematic view of a hydraulic control system for linear actuation of a lift system.

With reference to the figures, a hydraulic control system for linear actuation 10 includes an electric motor 12 connected to a hydraulic pump 14. The pump 14 is connected to a hydraulic cylinder 16 by flow line 18. Connected between the pump 14 and cylinder 16 on the flow line 18 is a pressure transducer 20, a pressure control valve 22, and a check valve 24. The pump 14 is also connected to a tank 26 via flow line 28.

The cylinder 16 is connected to the tank 26 by return line 30. Connected between flow line 18 and return line 30 is a control valve 32. Control valve 32 is connected to flow line 18 between check valve 24 and pump 14. Also connected between flow line 18 and return line 30 is a proportional control valve 34. The proportional control valve 34 is connected to the flow line 18 between the check valve 24 and the pressure control valve 22.

The proportional control valve 34 is connected to a processor 36 having software 38. Also connected to the processor 36 is an operator command 40 such as a joystick command. A common approach to achieve proportional speed control and load independent control is to use a proportional flow control valve together with a hydraulic compensator where the proportion control valve controls the flow rate, or lower speed, and the hydraulic compensator maintains the speed regardless of the load weight.

In one example of the present system, the pressure transducer 20 is used to estimate the pressure in the cylinder 16. Thus, the hydraulic compensator may be eliminated and the software 38 is used to change the proportional control valve's 34 opening area to maintain the speed regardless of load weight.

In operation, the processor 36 receives a command signal from the joystick command 40 and a signal from the pressure transducer 20 that provides a pressure measurement. The joystick command 40 from an operator represents the expectation of the operator on the lowering speed of the platform. The pressure measurement is used by the processor 36 to estimate the load on the platform. Using the software 38, the processor determines a valve command based upon the joystick command 40 and the pressure measurement. The desired valve command is then sent from the processor 36 to the proportional control valve 34 to achieve the desired opening area of the proportional control valve 34.

For example, the joystick command 40 is used as a desired lowering speed, which defines V in Equation 2. The pressure measurement is approximated as the pressure differential $\Delta P$ in Equation 1. The processor 36 is used to calculate the correct opening area $A_{orifice}$ so that the desired speed can be achieved based on the weight of the load in the platform. Look up tables or other techniques can be used to make the software 38 easy to tune and more flexible for different systems.

Thus, as has been disclosed, is a control system that enables the lowest actuation speeds to be achieved without violating the operating envelope of the power pack pump. This is accomplished by using a proportional control valve to divert pump flow away from the cylinder and back to the tank.

From the above discussion and accompanying figures and claims it will be appreciated that the hydraulic control system for linear actuation 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A hydraulic control system for linear actuation, comprising:

an electric motor connected to a hydraulic pump;

a hydraulic cylinder connected to the hydraulic pump by a first flow line;

a pressure transducer, a pressure control valve, and a check valve connected to the first flow line between the hydraulic pump and the hydraulic cylinder;

a tank connected to the hydraulic pump by a second flow line and the hydraulic cylinder by a return line;

a control valve connected between the first flow line and the return line; and a proportional control valve connected between the first flow line and the return line.

2. The system of claim 1 wherein the control valve is connected to the first flow line between the check valve and the hydraulic pump.

3. The system of claim 1 wherein the proportional control valve is connected to the first flow line between the check valve and the pressure control valve.

4. The system of claim 1 further comprising the proportional control valve is connected to a processor and an operator command.

5. The system of claim 4 wherein an opening area of the proportional control valve is controlled by the processor.

6. The system of claim 5 wherein the processor controls the proportional control valve based upon a pressure measurement.

7. The system of claim 6 wherein the pressure measurement is determined from a command signal from the operator command and a signal from the pressure transducer.

8. The system of claim 1 further comprising a processor connected to the proportional control valve and an operator command, wherein the processor estimates a load based on a pressure measurement received from the pressure transducer.

9. The system of claim 8 wherein the processor receives a command signal from the operator command.

10. The system of claim 9 wherein the processor determines a valve command based on the operator command and the estimated load, and the processor sends the valve command determined by the processor to the proportional control valve to modify operation of the proportional control valve.

11. A hydraulic control system for linear actuation, comprising:

an electric motor connected to a hydraulic pump;

a hydraulic cylinder connected to the hydraulic pump by a first flow line;

a pressure transducer, a pressure control valve, and a check valve connected to the first flow line between the hydraulic pump and the hydraulic cylinder;

the hydraulic cylinder connected to a return line;

a control valve connected between the first flow line and the return line; and a proportional control valve connected between the first flow line and the return line;

the proportional control valve connected to a processor and an operator command, wherein an opening area of the proportional control valve is controlled by the processor.

12. The system of claim 11 wherein the proportional control valve is connected to the first flow line between the check valve and the pressure control valve.

13. The system of claim 11 wherein the processor controls the proportional control valve based upon a pressure measurement.

14. The system of claim 13 wherein the pressure measurement is determined from a command signal from the operator command and a signal from the pressure transducer.

15. The system of claim 11 wherein the processor estimates a load based on a pressure measurement received from the pressure transducer.

16. The system of claim 11 wherein the processor determines a valve command based on the operator command and an estimated load, and the processor sends the valve command determined by the processor to the proportional control valve to modify operation of the proportional control valve.

17. A hydraulic control system for linear actuation, comprising:

an electric motor connected to a hydraulic pump;

a hydraulic cylinder connected to the hydraulic pump by a first flow line;

a pressure transducer, a pressure control valve, and a check valve connected to the first flow line between the hydraulic pump and the hydraulic cylinder;

the hydraulic cylinder connected to a return line;

a control valve connected between the first flow line and the return line; and a proportional control valve connected between the first flow line and the return line; and the proportional control valve operatively connected to a processor.

18. The system of claim 17 wherein an opening area of the proportional control valve is controlled by the processor.

19. The system of claim 17 wherein the processor estimates a load based on a pressure measurement received from the pressure transducer, and the processor determines a valve command based on the operator command and the estimated load, and the processor sends the valve command determined by the processor to the proportional control valve to modify operation of the proportional control valve.

* * * * *